(12) United States Patent
Wohl et al.

(10) Patent No.: US 11,820,866 B2
(45) Date of Patent: Nov. 21, 2023

(54) COPOLY(URETHANE CARBONATES) WITH TUNABLE PROPERTIES AND METHODS FOR MAKING AND USING THE SAME

(71) Applicant: UNITED STATES OF AMERICA AS REPRESENTED BY THE ADMINISTRATOR OF NASA, Washington, DC (US)

(72) Inventors: Christopher J. Wohl, Chesapeake, VA (US); Bryce L. Horvath, Virginia Beach, VA (US); Sidney Eichelberger, Dallas, TX (US); Nasef A. Junaid, Madison, AL (US)

(73) Assignee: UNITED STATES OF AMERICA AS REPRESENTED BY THE ADMINISTRATOR OF NASA, Washington, DC (US)

( * ) Notice: Subject to any disclaimer, the term of this patent is extended or adjusted under 35 U.S.C. 154(b) by 345 days.

(21) Appl. No.: 17/405,611

(22) Filed: Aug. 18, 2021

(65) Prior Publication Data

US 2022/0056211 A1 Feb. 24, 2022

Related U.S. Application Data

(60) Provisional application No. 63/233,576, filed on Aug. 16, 2021, provisional application No. 63/068,663, filed on Aug. 21, 2020.

(51) Int. Cl.
  *C08G 71/04* (2006.01)
  *B33Y 70/00* (2020.01)

(52) U.S. Cl.
  CPC .............. *C08G 71/04* (2013.01); *B33Y 70/00* (2014.12)

(58) Field of Classification Search
  CPC .... C08G 71/04; C08G 64/12; C08G 64/0241; C08G 64/305; C08G 64/42
  See application file for complete search history.

(56) References Cited

U.S. PATENT DOCUMENTS

| 2004/0092699 A1* | 5/2004 | Ueno | C08G 18/0895 |
|---|---|---|---|
| | | | 528/66 |
| 2010/0032090 A1* | 2/2010 | Myung | C08F 283/02 |
| | | | 424/425 |
| 2014/0187660 A1* | 7/2014 | Allen | C08G 64/183 |
| | | | 528/405 |

FOREIGN PATENT DOCUMENTS

CN        104910348        *  9/2015

OTHER PUBLICATIONS

Translation of CN 104910348 (Year: 2015).*
Chen, Macromolecules, 2017, 50, 2320-2328. (Year: 2017).*

* cited by examiner

*Primary Examiner* — Robert C Boyle
(74) *Attorney, Agent, or Firm* — Matthew R. Osenga; Robin W. Edwards; Trenton J. Roche

(57) ABSTRACT

Described herein are copoly(carbonate urethanes) with tunable properties. The copoly(carbonate urethanes) are produced from the reaction between an aryl diamine and an oligomer. By varying the molecular weight of the oligomer, the mechanical and thermal properties of the copoly(carbonate urethanes) can be modified (i.e., tuned). The copoly(carbonate urethanes) can be used to produce filaments for 3D printing applications that could have tunable properties for a variety of applications.

20 Claims, 6 Drawing Sheets
(3 of 6 Drawing Sheet(s) Filed in Color)

COPOLY(URETHANE CARBONATES) WITH TUNABLE PROPERTIES AND METHODS FOR MAKING AND USING THE SAME

CROSS-REFERENCE TO RELATED PATENT APPLICATION(S)

This patent application claims the benefit of and priority to U.S. Provisional Patent Application No. 63/068,663, filed on Aug. 21, 2020, entitled "Novel Copoly(urethane carbonate)s and articles of manufacture thereof," and U.S. Provisional Patent Application No. 63/233,576, filed on Aug. 16, 2021, entitled "Reversibly Assembled Microparticles for Sustained Applications," the contents of which are each hereby incorporated by reference in their entirety.

STATEMENT REGARDING FEDERALLY SPONSORED RESEARCH OR DEVELOPMENT

The invention described herein was made in part by employees of the United States Government and may be manufactured and used by or for the Government of the United States of America for governmental purposes without the payment of any royalties thereon or therefore.

BACKGROUND OF THE INVENTION

Missions beyond low-Earth orbit will have increasing demands on payload weight and multifunctional materials. One current approach toward reducing mission risk, especially for long-duration missions, is additive manufacturing techniques that permit the generation of mission-critical articles (tools, infrastructure, etc.) on-demand. Here, a supply of starting materials that can be efficiently packed and the necessary processing equipment to manufacture articles would likely take up less space than individual pre-manufactured articles. One limitation of this approach is that the current assessments treat the starting feedstock as finite.

Additive manufacturing is a rapidly advancing art with significant advances toward generation of materials from organic and metallic starting materials. Most additive manufacturing techniques involve a material (or energy) source that is raster scanned across an objective area. Resultant articles are generated layer-by-layer, which often results in anisotropic mechanical properties. This limitation can be mitigated through the use of secondary processing requiring additional processing infrastructure and energy. Another restriction is that once the article has been generated, it cannot be returned to starting material without energetic cost. Thus, development of a manufacturing technique that can generate precise, mechanically robust articles that could be returned to feedstock for use in subsequent article manufacture would be highly desired for exploration mission planning. This approach would ultimately reduce payload and energy requirements without sacrificing mission capabilities.

BRIEF SUMMARY OF THE INVENTION

Described herein are copoly(carbonate urethanes) with tunable properties. The copoly(carbonate urethanes) are produced from the reaction between an aryl diamine and an oligomer. By varying the molecular weight of the oligomer, the mechanical and thermal properties of the copoly(carbonate urethanes) can be modified (i.e., tuned). The copoly (carbonate urethanes) can be used to produce filaments for 3D printing applications that could have tunable properties for a variety of applications.

One embodiment of the invention is a copoly(urethane carbonate) having the structure I

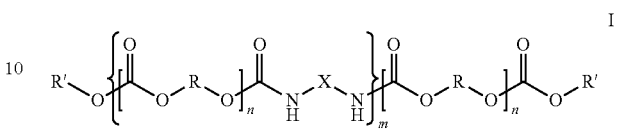

wherein R and R' are an alkyl group;
X is an aryl group;
n is from about 1 to about 40; and
m is from about 1 to about 40.

Another embodiment of the invention is microspheres comprising a coating of the copoly(urethane carbonate) described herein.

These and other features, advantages, and objects of the present invention will be further understood and appreciated by those skilled in the art by reference to the following specification, claims, and appended drawings.

BRIEF DESCRIPTION OF THE SEVERAL VIEWS OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE INVENTION

Figure 1:
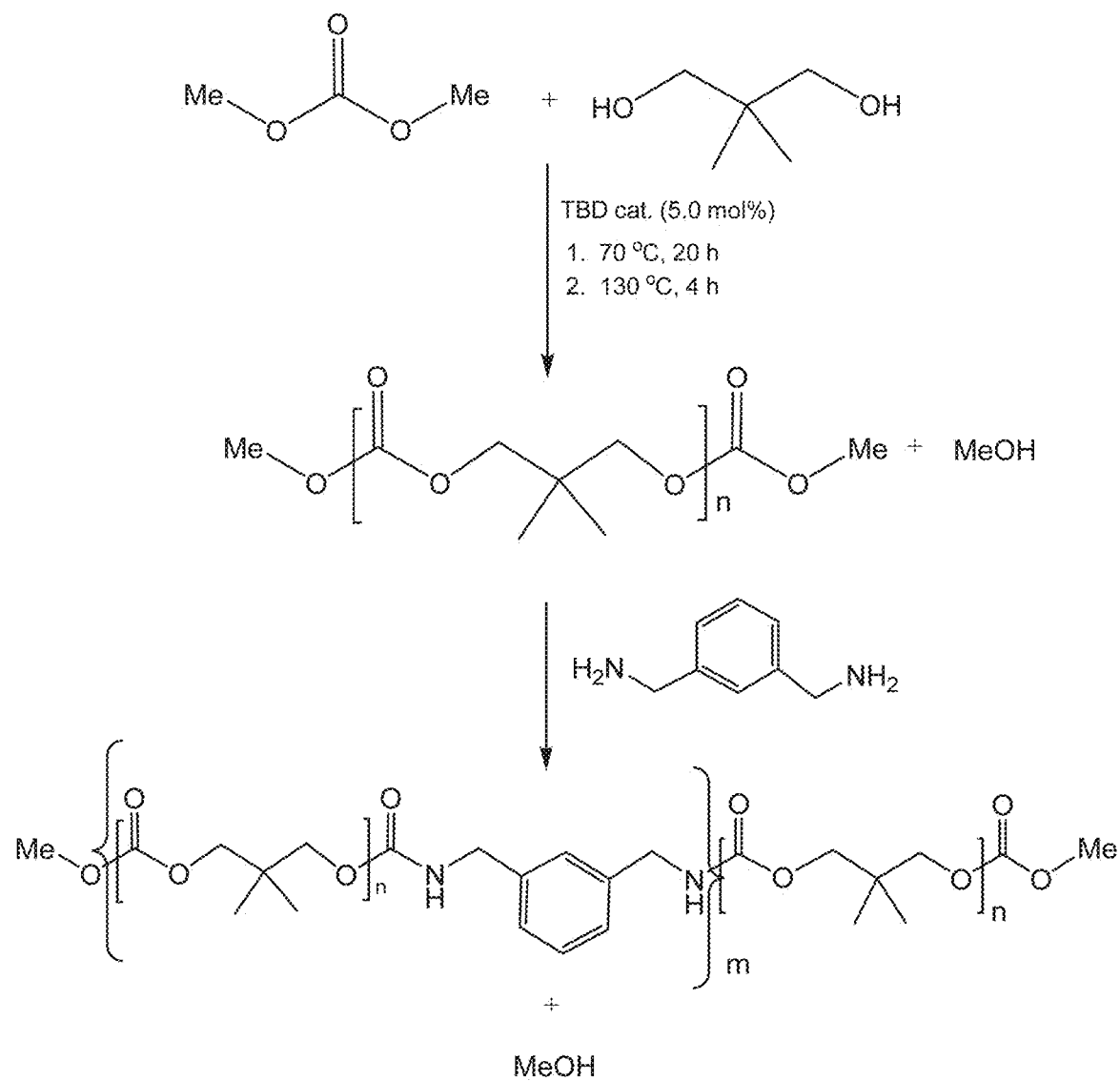
FIG. 1 depicts a reaction scheme for producing a copoly (urethane carbonate) described herein.

Many modifications and other embodiments disclosed herein will come to mind to one skilled in the art to which the disclosed compositions and methods pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. The skilled artisan will recognize many variants and adaptations of the aspects described herein. These variants and adaptations are intended to be included in the teachings of this disclosure and to be encompassed by the claims herein.

Although specific terms are employed herein, they are used in a generic and descriptive sense only and not for purposes of limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure.

Any recited method can be carried out in the order of events recited or in any other order that is logically possible. That is, unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided herein can be different from the actual publication dates, which can require independent confirmation.

While aspects of the present disclosure can be described and claimed in a particular statutory class, such as the system statutory class, this is for convenience only and one of skill in the art will understand that each aspect of the present disclosure can be described and claimed in any statutory class.

It is also to be understood that the terminology used herein is for the purpose of describing particular aspects only and is not intended to be limiting. Unless defined otherwise, all technical and scientific terms used herein have the same meaning as commonly understood by one of ordinary skill in the art to which the disclosed compositions and methods belong. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

Prior to describing the various aspects of the present disclosure, the following definitions are provided and should be used unless otherwise indicated. Additional terms may be defined elsewhere in the present disclosure.

Definitions

As used herein, "comprising" is to be interpreted as specifying the presence of the stated features, integers, steps, or components as referred to, but does not preclude the presence or addition of one or more features, integers, steps, or components, or groups thereof. Moreover, each of the terms "by", "comprising," "comprises", "comprised of" "including," "includes," "included," "involving," "involves," "involved," and "such as" are used in their open, non-limiting sense and may be used interchangeably. Further, the term "comprising" is intended to include examples and aspects encompassed by the terms "consisting essentially of" and "consisting of" Similarly, the term "consisting essentially of" is intended to include examples encompassed by the term "consisting of.

As used in the specification and the appended claims, the singular forms "a," "an" and "the" include plural referents unless the context clearly dictates otherwise. Thus, for example, reference to "a solvent" include, but are not limited to, mixtures or combinations of two or more such solvents, and the like.

It should be noted that ratios, concentrations, amounts, and other numerical data can be expressed herein in a range format. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. Ranges can be expressed herein as from "about" one particular value, and/or to "about" another particular value. Similarly, when values are expressed as approximations, by use of the antecedent "about," it will be understood that the particular value forms a further aspect. For example, if the value "about 10" is disclosed, then "10" is also disclosed.

When a range is expressed, a further aspect includes from the one particular value and/or to the other particular value. For example, where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In addition, the phrase "about 'x' to 'y'", where 'x' and 'y' are numerical values, includes "about 'x' to about 'y'".

It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to 5%" should be interpreted to include not only the explicitly recited values of about 0.1% to about 5%, but also include individual values (e.g., about 1%, about 2%, about 3%, and about 4%) and the sub-ranges (e.g., about 0.5% to about 1.1%; about 5% to about 2.4%; about 0.5% to about 3.2%, and about 0.5% to about 4.4%, and other possible sub-ranges) within the indicated range.

As used herein, the terms "about," "approximate," "at or about," and "substantially" mean that the amount or value in question can be the exact value or a value that provides equivalent results or effects as recited in the claims or taught herein. That is, it is understood that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art such that equivalent results or effects are obtained. In some circumstances, the value that provides equivalent results or effects cannot be reasonably determined. In such cases, it is generally understood, as used herein, that "about" and "at or about" mean the nominal value indicated ±10% variation unless otherwise indicated or inferred. In general, an amount, size, formulation, parameter or other quantity or characteristic is "about," "approximate," or "at or about" whether or not expressly stated to be such. It is understood that where "about," "approximate," or "at or about" is used before a quantitative value, the parameter also includes the specific quantitative value itself, unless specifically stated otherwise.

The term "alkyl" as used herein is a branched or unbranched saturated hydrocarbon group of 1 to 24 carbon atoms, such as methyl, ethyl, n-propyl, isopropyl, n-butyl, isobutyl, s-butyl, t-butyl, n-pentyl, isopentyl, s-pentyl, neopentyl, hexyl, heptyl, octyl, nonyl, decyl, dodecyl, tetradecyl, hexadecyl, eicosyl, tetracosyl, and the like. The alkyl group can be cyclic or acyclic. The alkyl group can be branched or unbranched. The alkyl group can also be substituted or unsubstituted. For example, the alkyl group can be substituted with one or more groups including, but not limited to, alkyl, cycloalkyl, alkoxy, amino, ether, halide, hydroxy, nitro, silyl, sulfo-oxo, or thiol, as described herein. A "lower alkyl" group is an alkyl group containing from one to six (e.g., from one to four) carbon atoms. The term alkyl group can also be a C1 alkyl, C1-C2 alkyl, C1-C3 alkyl, C1-C4 alkyl, C1-C5 alkyl, C1-C6 alkyl, C1-C7 alkyl, C1-C8 alkyl, C1-C9 alkyl, C1-C10 alkyl, and the like up to and including a C1-C24 alkyl.

An alkyl group as used herein also refers to alkylene groups represented by the general formula $(CH_2)_p$, where p is an integer from 1 to 10.

Throughout the specification "alkyl" is generally used to refer to both unsubstituted alkyl groups and substituted alkyl groups; however, substituted alkyl groups are also specifically referred to herein by identifying the specific substituent(s) on the alkyl group. For example, the term "halogenated alkyl" or "haloalkyl" specifically refers to an alkyl group that is substituted with one or more halide, e.g., fluorine, chlorine, bromine, or iodine. Alternatively, the term "monohaloalkyl" specifically refers to an alkyl group that is substituted with a single halide, e.g. fluorine, chlorine, bromine, or iodine. The term "polyhaloalkyl" specifically refers to an alkyl group that is independently substituted with two or more halides, i.e. each halide substituent need not be the same halide as another halide substituent, nor do the multiple instances of a halide substituent need to be on the same carbon. The term "alkoxyalkyl" specifically refers to an alkyl group that is substituted with one or more alkoxy groups, as described below. The term "aminoalkyl" specifically refers to an alkyl group that is substituted with one or more amino groups. The term "hydroxyalkyl" specifically refers to an alkyl group that is substituted with one or more hydroxy groups. When "alkyl" is used in one instance and a specific term such as "hydroxyalkyl" is used in another, it is not meant to imply that the term "alkyl" does not also refer to specific terms such as "hydroxyalkyl" and the like.

The term "aryl" as used herein is a group that contains any carbon-based aromatic group including, but not limited to, benzene, naphthalene, phenyl, biphenyl, anthracene, and the like. The aryl group can be substituted or unsubstituted. The aryl group can be substituted with one or more groups including, but not limited to, alkyl, cycloalkyl, alkoxy, alkenyl, cycloalkenyl, alkynyl, cycloalkynyl, aryl, heteroaryl, aldehyde, —$NH_2$, carboxylic acid, ester, ether, halide, hydroxy, ketone, azide, nitro, silyl, sulfo-oxo, or thiol as described herein. The term "biaryl" is a specific type of aryl group and is included in the definition of "aryl." In addition, the aryl group can be a single ring structure or comprise multiple ring structures that are either fused ring structures or attached via one or more bridging groups such as a carbon-carbon bond. For example, biaryl to two aryl groups that are bound together via a fused ring structure, as in naphthalene, or are attached via one or more carbon-carbon bonds, as in biphenyl. Fused aryl groups including, but not limited to, indene and naphthalene groups are also contemplated.

The terms "aralkyl" as used herein is an aryl group with one or more alkyl groups. For example, a benzyl group has a phenyl ring with a methylene ($CH_2$) group bonded to the ring.

Unless stated to the contrary, a formula with chemical bonds shown only as solid lines and not as wedges or dashed lines contemplates each possible isomer, e.g., each enantiomer and diastereomer, and a mixture of isomers, such as a racemic or scalemic mixture. Compounds described herein can contain one or more asymmetric centers and, thus, potentially give rise to diastereomers and optical isomers. Unless stated to the contrary, the present invention includes all such possible diastereomers as well as their racemic mixtures, their substantially pure resolved enantiomers, all possible geometric isomers, and pharmaceutically acceptable salts thereof. Mixtures of stereoisomers, as well as isolated specific stereoisomers, are also included. During the course of the synthetic procedures used to prepare such compounds, or in using racemization or epimerization procedures known to those skilled in the art, the products of such procedures can be a mixture of stereoisomers.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

Disclosed are the components to be used to conduct the methods of the invention as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds cannot be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the invention. Thus, if there are a variety of additional steps that can be performed it is understood that each of these additional steps can be performed with any specific embodiment or combination of embodiments of the methods of the invention.

As used herein, the terms "optional" or "optionally" means that the subsequently described event or circumstance can or cannot occur, and that the description includes instances where said event or circumstance occurs and instances where it does not.

Unless otherwise specified, temperatures referred to herein are based on atmospheric pressure (i.e. one atmosphere).

It is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Copoly (Urethane Carbonates)

Described herein are copoly(carbonate urethanes) with tunable properties. The copoly(carbonate urethanes) are produced from the reaction between an aryl diamine and an oligomer. By varying the molecular weight of the oligomer, the mechanical and thermal properties of the copoly(carbonate urethanes) can be modified (i.e., tuned). The copoly(carbonate urethanes) can be used to produce filaments for 3D printing applications that could have tunable properties for a variety of applications.

In one aspect, the copoly(urethane carbonate) has the structure I

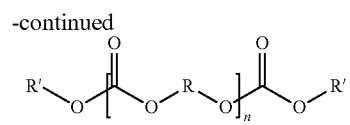

wherein R and R' are an alkyl group;
X is an aryl group;
n is from about 1 to about 40; and
m is from about 1 to about 40.

The copoly(urethane carbonate) is produced by a two step process. First, an oligomer is produced by reacting a dialkyl carbonate with an alkyl diol. The general process for making the oligomer is provided below.

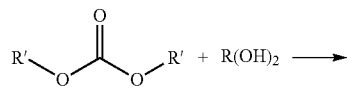

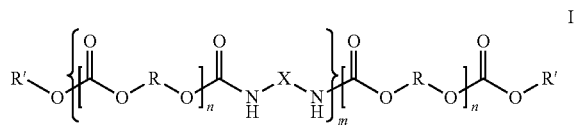

The molecular weight of the oligomer can vary depending upon the amount of dialkyl carbonate with an alkyl diol used in the reaction. In one aspect, the oligomer has a molecular weight of about 200 g/mol to about 5,000 g/mol, or about 200 g/mol, 400 g/mol, 600 g/mol, 800 g/mol, 1,000 g/mol, 1,200 g/mol, 1,400 g/mol, 1,600 g/mol, 1,800 g/mol, 2,000 g/mol, 2,200 g/mol, 2,400 g/mol, 2,600 g/mol, 2,800 g/mol, 3,000 g/mol, 3,200 g/mol, 3,400 g/mol, 3,600 g/mol, 3,800 g/mol, 4,000 g/mol, 4,200 g/mol, 4,400 g/mol, 4,600 g/mol, 4,800 g/mol, or 5,000 g/mol, where any value can be a lower and upper endpoint of a range (e.g., 1,200 g/mol to 3,000 g/mol). The value for n in the oligomer can vary depending upon the concentration of the dialkyl carbonate and alkyl diol used to produce the oligomer. The value for n can be any numerical value in between 1 and 40 (e.g., 7.8, 15.3, 20.5, etc.). The value for n can also be any integer between 1 and 40 (e.g., 1, 11, 26, 37, etc.).

The selection of the dialkyl carbonate and alkyl diol can vary. In one aspect, the dialkyl carbonate is a $C_1$ to $C_{10}$ dialkyl carbonate, where R' is a $C_1$ to $C_{10}$ dialkyl. In another aspect, the dialkyl carbonate is dimethyl carbonate.

In another aspect, the alkyl diol is a $C_1$ to $C_{10}$ dialkyl diol, where R is a $C_1$ to $C_{10}$ dialkyl. In one aspect, the alkyl diol is a solid at room temperature. In another aspect, the alkyl diol is neopentyl glycol.

By varying the concentration of the dialkyl carbonate and alkyl diol, the molecular weight of the oligomer can be modified. In one aspect, a stoichiometric amount of dialkyl carbonate and alkyl diol are used to produce the oligomer. In certain aspects, the dialkyl carbonate and alkyl diol are reacted with one another in the presence of a catalyst such as, for example, triazabicyclodecene. In order to ensure the reaction goes to completion, heat can be applied. In one aspect, the reaction between the dialkyl carbonate and alkyl diol can conducted at a temperature of from about 50° C. to about 150° C. Non-limiting methods for producing the oligomers described herein are provided in the Examples.

The second step for making the copoly(urethane carbonates) described herein involves reacting the oligomer with an aryl diamine. An "aryl diamine" as used herein is an aryl compound with two amino (—NH₂) groups. The general process for making the copoly(urethane carbonate) by reacting the oligomer with the aryl diamine is provided below.

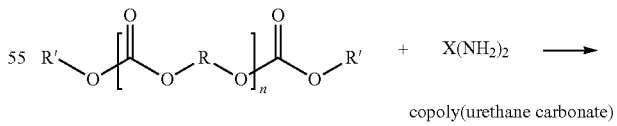

copoly(urethane carbonate)

By varying the nature of the aryl group of the aryl diamine, certain properties of the copoly(urethane carbonate) can be modified. In one aspect, the aryl diamine is an aralkyl diamine. In another aspect, the aryl diamine is a dimethylene phenyl diamine. An example of a dimethylene phenyl diamine is provided below, where o is an integer from 1 to 5. In one aspect, the aryl diamine is a xylylenediamine such as, for example, m-xylylenediamine

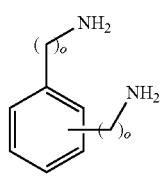

By varying the concentration of the oligomer and the aryl diamine, the molecular weight of the copoly(urethane carbonate) can be modified. The value of m in the structure I can vary depending upon the concentration of the oligomer and the aryl diamine used to produce the copoly(urethane carbonate). The value for m can be any numerical value in between 1 and 40 (e.g., 7.8, 15.3, 20.5, etc.). The value for n can also be any integer between 1 and 40 (e.g., 1, 11, 26, 37, etc.). In one aspect, a stoichiometric amount of oligomer and aryl diamine are used to produce the copoly(urethane carbonate).

In certain aspects, the oligomer and the aryl diamine are reacted with one another in the presence of a catalyst such as, for example, triazabicyclodecene. In order to ensure the reaction goes to completion, heat can be applied. In one aspect, the reaction between the oligomer and the aryl diamine can conducted at a temperature of from about 50° C. to about 150° C. Non-limiting methods for producing the copoly(urethane carbonate) described herein are provided in the Examples.

As discussed above, by varying the molecular weight of the oligomer used to produce the copoly(urethane carbonate), the mechanical and thermal properties of the resulting copoly(carbonate urethanes) can be modified (i.e., tuned). The tunability of the copoly(urethane carbonates) described herein permits the polymers to be processed by a number of different techniques to produce a variety of different articles.

In one aspect, the glass transition temperature of the copoly(urethane carbonate) can be modified by varying the molecular weight of the oligomer. In one aspect, when n in structure I above is from about 1 to about 4, the copoly (urethane carbonate) has a glass transition temperature from about 30° C. to about 40° C. In another aspect, when the oligomer has a molecular weight up to about 500 g/mol, the copoly(urethane carbonates) has a glass transition temperature from about 30° C. to about 40° C.

In one aspect, when n in structure I above is greater than 4 to about 8, the copoly(urethane carbonate) has a glass transition temperature from about than 20° C. to about 30° C. In another aspect, when the oligomer has a molecular weight from about 500 g/mol to about 750 g/mol, the copoly(urethane carbonate) has a glass transition temperature from about than 20° C. to about 30° C.

In one aspect, when n in structure I above is greater than 8 to about 30, the copoly(urethane carbonate) has a glass transition temperature less than 20° C. In another aspect, when the oligomer has a molecular weight greater than 750 g/mol, the copoly(urethane carbonate) has a glass transition temperature less than 20° C.

In one aspect, the elastic modulus of the copoly(urethane carbonate) can be modified by varying the molecular weight of the oligomer. In one aspect, when n in structure I is less than about 8, the copoly(urethane carbonate) has an elastic modulus of at least 1,000 MPa as determined by ASTM D638. In another aspect, when the molecular weight of the oligomer is less than 1,000 g/mol, the copoly(urethane carbonate) has an elastic modulus of at least 1,000 MPa as determined by ASTM D638.

In one aspect, wherein when n in structure I is from greater than 8 to about 15, the copoly(urethane carbonate) has an elastic modulus of from about 500 MPa to less than 1,000 MPa as determined by ASTM D638. In another aspect, when the molecular weight of the oligomer is from about 1,000 g/mol to about 2,000 g/mol, the copoly(urethane carbonate) has an elastic modulus of about 500 MPa to less than 1,000 MPa as determined by ASTM D638.

In one aspect, wherein when n in structure I is greater than 15 to about 23, the copoly(urethane carbonate) has an elastic modulus of from about 80 MPa to less than 500 MPa as determined by ASTM D638. In another aspect, when the molecular weight of the oligomer is from about 2,000 g/mol to about 3,000 g/mol, the copoly(urethane carbonate) has an elastic modulus of about 80 MPa to less than 500 MPa as determined by ASTM D638.

In one aspect, wherein when n in structure I is greater than 23 to about 30, the copoly(urethane carbonate) has an elastic modulus of from about 10 MPa to less than 80 MPa as determined by ASTM D638. In another aspect, when the molecular weight of the oligomer is from about 3,000 g/mol to about 4,000 g/mol, the copoly(urethane carbonate) has an elastic modulus of about 10 MPa to less than 80 MPa as determined by ASTM D638.

The copoly(urethane carbonates) described herein also tunable and favorable rheological properties. In one aspect, the copoly(urethane carbonate) has a viscosity of about $1 \times 10^4$ 1 V1 Pa/s to about $1 \times 10^5$ MPa/s at a temperature of from about 70° C. to about 130° C., or about $1 \times 10^4$ MPa/s, $1.5 \times 10^4$ MPa/s, $2 \times 10^4$ MPa/s, $2.5 \times 10^4$ MPa/s, $3 \times 10^4$ MPa/s, $3.5 \times 10^4$ MPa/s, $4 \times 10^4$ MPa/s, $4.5 \times 10^4$ MPa/s, $5 \times 10^4$ MPa/s, $5.5 \times 10^4$ MPa/s, $6 \times 10^4$ MPa/s, $6.5 \times 10^4$ MPa/s, $7 \times 10^4$ MPa/s, $7.5 \times 10^4$ MPa/s, $8 \times 10^4$ MPa/s, $8.5 \times 10^4$ MPa/s, $9 \times 10^4$ MPa/s, $9.5 \times 10^4$ MPa/s, or $1 \times 10^5$ MPa/s, where any value can be a lower and upper endpoint of a range (e.g., $3 \times 10^4$ MPa/s to $7.5 \times 10^4$ MPa/s). The rheological properties of the copoly (urethane carbonates) described herein are comparable to other polymers used in 3-D printing. For example, polylactic acid (PLA) filament has a comparable viscosity to the copoly(urethane carbonates) described herein at a temperature of about 250° C. Thus, the copoly(urethane carbonates) described herein have much lower processing temperatures when compared to materials currently used for 3-D printing.

The copoly(urethane carbonates) described herein are useful in making a wide variety of articles. In one aspect, the copoly(urethane carbonates) described herein can be used to produce articles by additive manufacturing. Additive manufacturing is a rapidly advancing art with significant advances toward generation of materials from organic and metallic starting materials. Most additive manufacturing techniques involve a material (or energy) source that is raster scanned across an objective area, where the resultant articles are generated layer-by-layer. In one aspect, the copoly(urethane carbonates) described herein are suitable for processing in a variety of techniques such as, for example, pellet formation for compression molding, filament extrusion for 3-D printing, casting for coating preparation, as well as other common polymer techniques.

In one aspect, microspheres having a coating of a copoly (urethane carbonate) described herein can be prepared and used to make filaments for 3-D printing and other shaped articles. In one aspect, the oligomer and aryl diamine are mixed with microspheres bearing a plurality of amino groups. Polymerization occurs in the presence of the microspheres, where ultimately, the copoly(urethane carbonate) that is produced is covalently bonded to the microsphere. In one aspect, the microspheres are produced by reacting an epoxy prepolymer with an excess of diamine hardening agent. For example, a diglycidyl ether of bisphenol A can be reacted with an aryl diamine (e.g., 2,4-diaminotoluene), an alkyl diamine, or a cycloalkyl diamine (e.g., isophorone diamine). The methods disclosed in Traina, et al., *J Colloid Interface Sci.* 2012, 368, pp 158-164 can be used to produce microspheres useful herein.

The thickness of the copoly(urethane carbonate) can vary and be controlled by modifying the concentration of the oligomer and aryl diamine used to produce the copoly (urethane carbonate). In one aspect, the copoly(urethane carbonate) coating has a thickness of from about 0.5 μm to about 5 μm, or about 0.5 μm, 1 μm, 1.5 μm, 2 μm, 2.5 μm, 3 μm, 3.5 μm, 4 μm, 4.5 μm, or 5 μm, where any value can be a lower and upper endpoint of a range (e.g., 1 μm to 2.5 μm). Non-limiting methods for producing the coated microsphere described herein are provided in the Examples.

The copoly(urethane carbonates) described herein are useful in producing recyclable products. For example, as the copoly(urethane carbonate) will be a recyclable feedstock that is brought on-site as a primary structure. Once the use of the primary structure is no longer necessary, the primary structure can be heated to produce the copoly(urethane carbonate) as a feedstock for a new, secondary structure. This approach of recycling and using the copoly(urethane carbonate) has numerous applications where space is of essence. For example, space travel for extended periods of time would benefit from the use of the copoly(urethane carbonates) described herein. Since the copoly(urethane carbonate) can be reused, it can provide required parts and articles that were not deemed critical during mission planning. This could dramatically reduce risk associated with long duration exploration missions. Moreover, the reuse of the copoly(urethane carbonate) can considerably improve weight and volume restrictions that could limit the scope or duration of an exploration mission.

In addition to space travel and exploration, the use of the copoly(urethane carbonates) described herein have many other applications ranging from use of these materials for recyclable/repurpose-able articles (structural, decorative, etc.) to a simple child's toy. The ability to tune the properties under which the copoly(urethane carbonate) can be manipulated permits material processing in a number of different facilities. This could potentially enable a cadre of end-user applications from a remoldable support structure in a construction environment to simple counter-top decorations. More demanding uses such as for replacement parts in complex systems are also possible, such as on an oceanic oil drill, wind turbine, research outpost, and military operations.

Aspects

Aspect 1. A copoly(urethane carbonate) having the structure I $$R'\!-\!O\!-\!\left[\!\!\begin{array}{c}O\\\|\\C\end{array}\!\!-\!O\!-\!R\!-\!O\right]_n\!\!-\!\!\begin{array}{c}O\\\|\\C\end{array}\!\!-\!\!\underset{H}{N}\!-\!X\!-\!\underset{H}{N}\!\!-\!\!\left[\!\!\begin{array}{c}O\\\|\\C\end{array}\!\!-\!O\!-\!R\!-\!O\right]_n\!\!-\!\!\begin{array}{c}O\\\|\\C\end{array}\!\!-\!O\!-\!R'$$

wherein R and R' are an alkyl group;
X is an aryl group;
n is from about 1 to about 40; and
m is from about 1 to about 40.

Aspect 2. The copoly(urethane carbonate) of aspect 1, wherein R and R' are each a $C_1$ to $C_{10}$ alkyl group.

Aspect 3. The copoly(urethane carbonate) of aspects 1 or 2, wherein R is a neopentyl group.

Aspect 4. The copoly(urethane carbonate) of any one of aspects 1-3, wherein X is an aralkyl group.

Aspect 5. The copoly(urethane carbonate) of any one of aspects 1-3, wherein X is a dimethylene phenyl group.

Aspect 6. The copoly(urethane carbonate) of aspect 1, wherein R is a neopentyl group and X is a dimethylene phenyl group.

Aspect 7. The copoly(urethane carbonate) of any one of aspects 1-6 produced by the process comprising
 (a) reacting a dialkyl carbonate with an alkyl diol to produce an oligomer; and
 (b) reacting the oligomer with an aryl diamine.

Aspect 8. The copoly(urethane carbonate) of any one of aspects 1-7, wherein when n is from about 1 to about 4, the copoly(urethane carbonate) has a glass transition temperature from about 30° C. to about 40° C.

Aspect 9. The copoly(urethane carbonate) of any one of aspects 1-7, wherein when n is greater than 4 to about 8, the copoly(urethane carbonate) has a glass transition temperature from about than 20° C. to about 30° C.

Aspect 10. The copoly(urethane carbonate) of any one of aspects 1-7, wherein when n is greater than 8 to about 30, the copoly(urethane carbonate) has a glass transition temperature less than 20° C.

Aspect 11. The copoly(urethane carbonate) of any one of aspects 1-7, wherein when n is less than about 8, the copoly(urethane carbonate) has an elastic modulus of at least 1,000 MPa as determined by ASTM D638.

Aspect 12. The copoly(urethane carbonate) of any one of aspects 1-7, wherein when n is greater than 8 to about 15, the copoly(urethane carbonate) has an elastic modulus of about 500 MPa to less than 1,000 MPa as determined by ASTM D638.

Aspect 13. The copoly(urethane carbonate) of any one of aspects 1-7, wherein when n is greater than 15 to about 23, the copoly(urethane carbonate) has an elastic modulus of about 80 MPa to less than 500 MPa as determined by ASTM D638.

Aspect 14. The copoly(urethane carbonate) of any one of aspects 1-7, wherein when n is greater than 23 to about 30, the copoly(urethane carbonate) has an elastic modulus of about 10 MPa to less than 80 MPa as determined by ASTM D638.

Aspect 15. The copoly(urethane carbonate) of any one of aspects 1-7, wherein the copoly(urethane carbonate) has a viscosity of about $1\times10^4$ MPa/s to about $1\times10^5$ MPa/s at a temperature of from about 70° C. to about 130° C.

Aspect 16. A microsphere comprising a coating of the copoly(urethane carbonate) of any one of aspects 1-15.

Aspect 17. The microsphere of aspect 16, wherein the coating has a thickness of from about 0.5 μm to about 5 μm.

Aspect 18. An article comprising the copoly(urethane carbonate) of any one of aspects 1-15.

Aspect 19. The article of aspect 18, wherein the article is produced by additive manufacturing.

Aspect 20. The article of aspect 18, wherein the article is produced by three-dimensional printing.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary of the disclosure and are not intended to limit the scope of what the inventors regard as their disclosure. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure.

Experimental

Materials and methods. All materials were obtained from Millipore Sigma and used as received. Spectroscopic characterization was performed on a Thermo Fisher Scientific Nicolet iS5 FTIR with iD7 ATR attachment and a Bruker 300 Ultra Shield™ using $CDCl_3$. All $^1H$ NMR spectra were referenced to the solvent peak at 7.26 ppm. Optical microscopy was performed using a Leica DM8000M. Thermal gravimetric analysis was performed using a TA Instruments TGA Q50 with heating from ambient to 600° C. at 10° C./min. Glass transition temperatures ($T_g$) were determined using a TA Instruments DSC Q20 with initial heating to 100° C., followed by cooling to −40° C. and subsequent heating to 100° C. Heating and cooling rates were 10° C./min and 50° C./min, respectively. $T_g$ was determined during the second heat cycle. Mechanical properties were determined according to ASTM D638 using Type V dog bone specimens using an Instron 5944 universal tensile tester with a 2 KN load cell.

All syntheses were performed using flame-dried glassware under a nitrogen atmosphere. For synthesis of the carbonate oligomers (FIG. 1), a 3-necked flask was outfitted with a mechanical stir rod, an $N_2$ inlet, and a vigreux column. This was charged with dimethyl carbonate (DMC), neopentylglycol (NPG), triazabicyclodecene (TBD). The NPG:DMC molar ratio was varied, while the TBD:NPG molar ratio was 0.05 for all syntheses. The flask was placed in an oil bath and heated with stirring to 70° C. under $N_2$ for approximately 20 h. A Dean-Stark trap was placed below the vigreux column and the oil bath temperature was raised to 130° C. to remove unreacted DMC. The resultant product was transferred to a sample vial for further analysis.

Copoly(carbonate urethane) (CPCU) synthesis was completed in the same glassware configuration as the carbonate oligomer synthesis (FIG. 1). For this reaction, the glassware was charged with the carbonate oligomer, m-xylylenediamine, and TBD. Reactants were at stoichiometric equivalence with a TBD molar ratio of 0.05. The flask was placed in an oil bath and heated with stirring to 70° C. for 1 h and to 130° C. overnight. The resultant product was transferred to a sample vial for further analysis.

CPCU-coated epoxy microspheres were prepared in a similar fashion with epoxy microspheres, synthesized according to a literature procedure (M. Traina, et al., *J Colloid Interface Sci.* 2012, 368, pp 158-164) present in the reaction solution [diethylene glycol diethyl ether (DEGDE) at 20 weight percent (wt %) solids]. Target polymer thickness values were utilized to determine requisite reactant masses. A target polymer molecular weight of 5000 was utilized to determine reactant ratios using the Carothers equation (Eq. 1), where r is the reactant ratio with the carbonate oligomer in excess (W. Carothers, *Trans. Faraday Soc.* 1936, 32, pp 39-49). Upon completion of the reaction, the particles were collected via filtration using a Buchner funnel and resuspended in acetone. This solution was sonicated for 10 min and spun down in a centrifuge at 4500 rpm for 10 min. The supernatant was decanted off and replaced with additional acetone. This process was repeated in triplicate to remove any polymeric material that was not strongly associated with epoxy microparticles.

$$DP = \frac{1+r}{1-r} \quad \text{(Eq. 1)}$$

Results and Discussion

Figure 2:
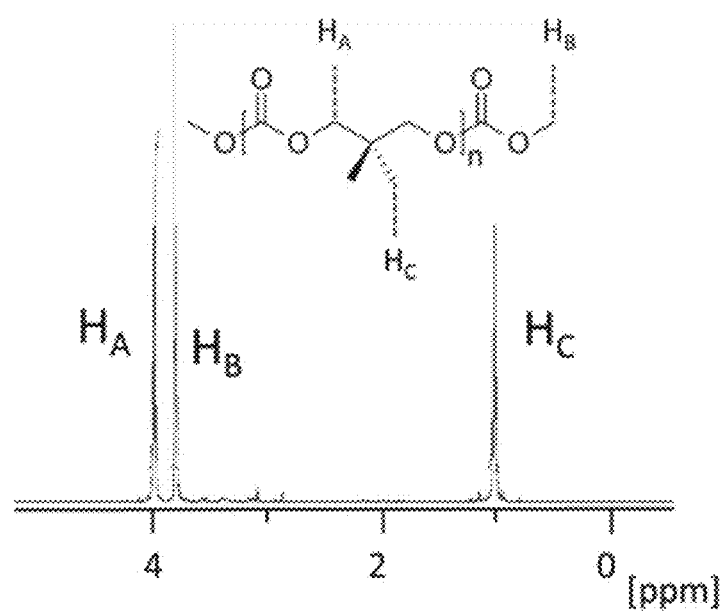
FIG. 2 shows the $^1$H NMR spectrum of neopentylene carbonate oligomer produced herein.

Copoly(carbonate urethane)s were synthesized for use as a potentially 3D printable material or as a polymeric coating on epoxy microparticles. Carbonate oligomers were synthesized at different NPG:DMC ratios to study the structure-property relationships for this material. The symmetry present in the NPG starting material and the unreacted methoxy group on the terminal DMC moieties enabled facile molecular weight determination via $^1H$ NMR (FIG. 2).

Figure 3:
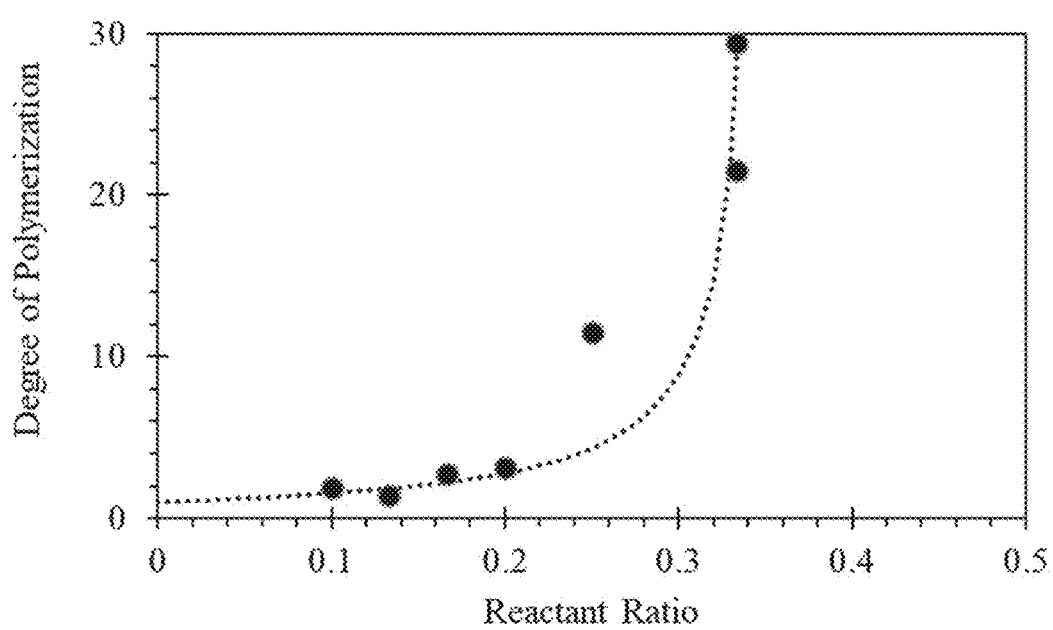
FIG. 3 shows the relationship between NPG:DMC ratio and calculated degree of polymerization. The dotted line is the degree of polymerization based on the modified Carothers equation.

Variation of the NPG:DMC ratio from 0.13 to 0.25 resulted in a change in carbonate oligomer molecular weight from approximately 280 to 3900 g/mol. This correlates to a degree of polymerization (DP) range from 1.5 to 29, respectively (FIG. 3). These results indicated a significant deviation from predictions according to the Carothers equation (Eq. 1). Although a modified Carothers equation (Eq. 2) which considers the influence of a significant stoichiometric offset on reactant conversion better reproduces the data, the conversion factor (p) was calculated to be greater than 1 (p=1.92). Although this could be indicative of different reaction mechanisms being involved, the simplicity of the resultant $^1H$ NMR spectra suggests that a majority of the reactions occurred between carbonate and hydroxyl functionalities.

$$DP = \frac{1+r}{r+1-2rp} \quad \text{(Eq. 2)}$$

Figure 4:
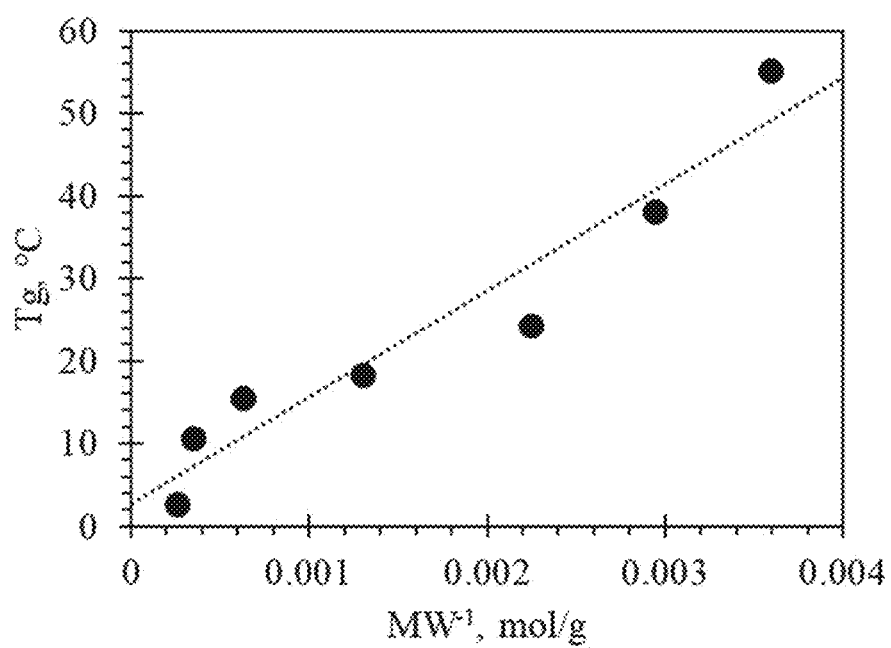
FIG. 4 shows the dependence of $T_g$ on carbonate oligomer molecular weight.
Figure 5:
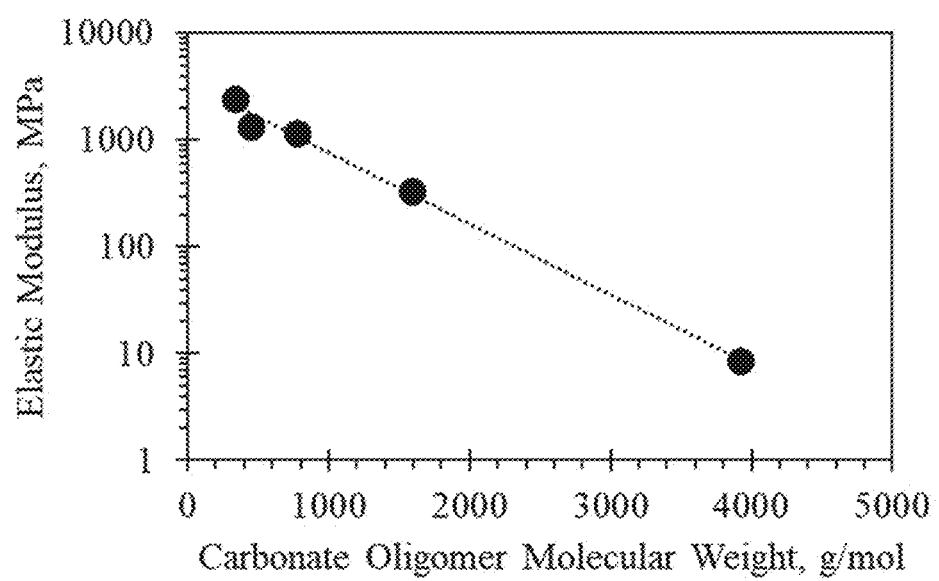
FIG. 5 shows the elastic modulus dependence on carbonate molecular weight determined according to ASTM D638. Fit line is to guide the eye.

Copoly(carbonate urethane)s were synthesized using the carbonate oligomers. Differences in the carbonate oligomer molecular weight resulted in significant changes in the $T_g$ (FIG. 4) and modulus (FIG. 5) of the generated CPCU materials. Interestingly, as a result of the $T_g$ range encompassing room temperature (e.g., 20-22° C.), the CPCU exhibited qualitative mechanical changes from very pliable to extremely brittle. With all of the CPCU materials synthesized in this work being executed at stoichiometric equivalence, the change in $T_g$ was compared to the change in carbonate oligomer molecular weight. Change in $T_g$ as a polymer's number average molecular weight ($M_n$) changes is often well described by the Flory-Fox equation (Eq. 3). This relationship was determined to accurately reproduce the relationship between $T_g$ and $M_n$ for the materials described here with the infinite $T_g$ value [$T_g(\infty)$] found to be 2.7° C.

$$T_g(M_n) = T_g(\infty) - \frac{K}{M_n} \quad \text{(Eq. 3)}$$

Modulus values for this series of CPCU materials were observed over four orders of magnitude. They were dependent on both the carbonate oligomer molecular weight (FIG. 5) and CPCU $T_g$. Discerning a relationship between carbonate oligomer molecular weight, CPCU $T_g$, and CPCU mechanical properties is difficult due to their interdependence. Further, the fracture mechanics involved during tensile testing may differ according to the test temperature proximity to material $T_g$. Further understanding of the relationships between these three parameters is currently being explored.

Collectively, the significant change in mechanical and thermal properties with relatively facile changes in polymer composition indicate that this material could be suitable for processing utilizing several techniques, i.e., pellet formation for compression molding, filament extrusion for 3D printing, casting for coating preparation, as well as other common polymer techniques.

Figure 6:
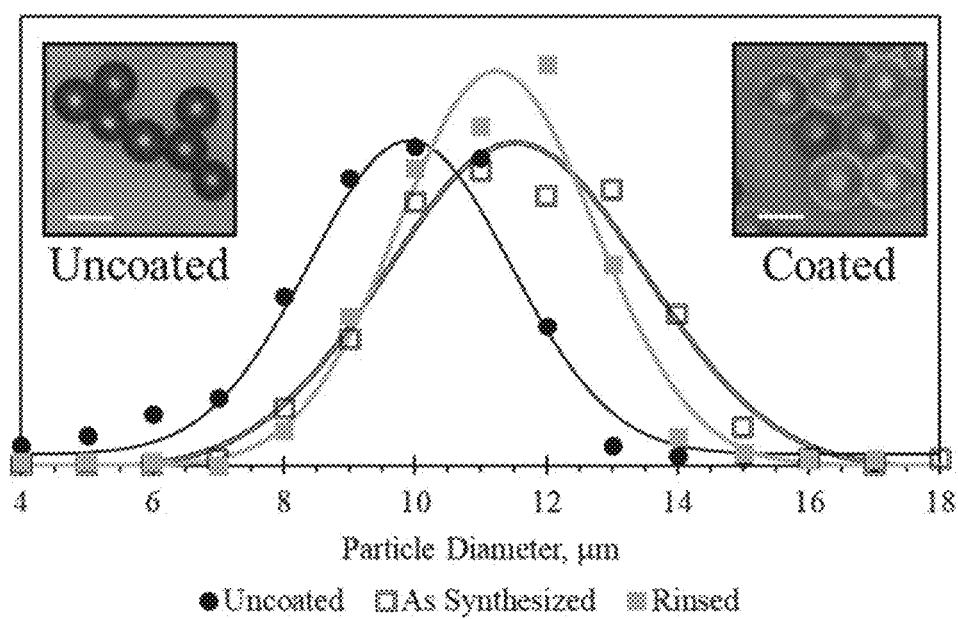
FIG. 6 shows the particle size distributions from optical image analysis of epoxy microparticles. The scale bar in the insets is 10 μm.

As an example, epoxy microspheres with a hardner:epoxy effective molar ratio of 1.7, resulting in the presence of unreacted amine functionalities on the particle surface, were used in the synthesis of a CPCU with a carbonate oligomer molecular weight of 771 g/mol. The reaction was conducted under relatively dilute conditions to encourage these surface-bound amines to participate as reactive anchoring sites for the CPCU coating. The target polymer coating thickness was 1 μm. Once synthesized, the coated epoxy microspheres were subjected to rigorous mixing to remove any polymeric or oligomeric species that were not strongly bound to the surface. Optical microscopy was utilized to determine the change in particle diameter as a result of being coated by the CPCU. As the results indicate (FIG. 6), the diameter increased from 9.9±1.5 μm to 11.5±2.0 μm after coating synthesis and was reduced to 11.2±1.5 μm upon rinsing. This was determined by binning the measured particle diameters of at least 100 particles followed by Gaussian fits to the generated histograms. The average diameter was determined as the maximum value of the Gaussian peak.

CONCLUSION

A series of CPCUs were prepared with varying carbonate segment molecular weight. The molecular weight of the carbonate segment had a strong influence on thermal and mechanical properties. Epoxy microparticles with amino surface functionalities were prepared and subsequently coated with CPCUs. After washing the particles with solvent, the diameter of the particles exhibited a notable increase indicating the reaction between the surface amino groups and the CPCU. Efforts to integrate reversible chemical reactions and expand the range of investigated compositions are underway and imperative to enable more complex investigations into cyclic behavior, material property retention, and creep properties It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

What is claimed is:

1. A copoly(urethane carbonate) having the structure I wherein R and R' are an alkyl group;
X is an aryl group;
n is from about 1 to about 40; and
m is from about 1 to about 40.

2. The copoly(urethane carbonate) of claim 1, wherein R and R' are each a $C_1$ to $C_{10}$ alkyl group.

3. The copoly(urethane carbonate) of claim 1, wherein R is a neopentyl group.

4. The copoly(urethane carbonate) of claim 1, wherein X is an aralkyl group.

5. The copoly(urethane carbonate) of claim 1, wherein X is a dimethylene phenyl group.

6. The copoly(urethane carbonate) of claim 1, wherein R is a neopentyl group and X is a dimethylene phenyl group.

7. The copoly(urethane carbonate) of claim 1 produced by the process comprising
    (a) reacting a dialkyl carbonate with an alkyl diol to produce an oligomer; and
    (b) reacting the oligomer with an aryl diamine.

8. The copoly(urethane carbonate) of claim 1, wherein when n is from about 1 to about 4, the copoly(urethane carbonate) has a glass transition temperature from about 30° C. to about 40° C.

9. The copoly(urethane carbonate) of claim 1, wherein when n is greater than 4 to about 8, the copoly(urethane carbonate) has a glass transition temperature from about than 20° C. to about 30° C.

10. The copoly(urethane carbonate) of claim 1, wherein when n is greater than 8 to about 30, the copoly(urethane carbonate) has a glass transition temperature less than 20° C.

11. The copoly(urethane carbonate) of claim 1, wherein when n is less than about 8, the copoly(urethane carbonate) has an elastic modulus of at least 1,000 MPa as determined by ASTM D638.

12. The copoly(urethane carbonate) of claim 1, wherein when n is greater than 8 to about 15, the copoly(urethane carbonate) has an elastic modulus of about 500 MPa to less than 1,000 MPa as determined by ASTM D638.

13. The copoly(urethane carbonate) of claim 1, wherein when n is greater than 15 to about 23, the copoly(urethane carbonate) has an elastic modulus of about 80 MPa to less than 500 MPa as determined by ASTM D638.

14. The copoly(urethane carbonate) of claim 1, wherein when n is greater than 23 to about 30, the copoly(urethane carbonate) has an elastic modulus of about 10 MPa to less than 80 MPa as determined by ASTM D638.

15. The copoly(urethane carbonate) of claim 1, wherein the copoly(urethane carbonate) has a viscosity of about $1 \times 10^4$ MPa/s to about $1 \times 10^5$ MPa/s at a temperature of from about 70° C. to about 130° C.

16. A microsphere comprising a coating of the copoly (urethane carbonate) of claim 1.

17. The microsphere of claim 16, wherein the coating has a thickness of from about 0.5 μm to about 5 μm.

18. An article comprising the copoly(urethane carbonate) of claim 1.

19. The article of claim 18, wherein the article is produced by additive manufacturing.

20. The article of claim 18, wherein the article is produced by three-dimensional printing.

* * * * *